US005780976A

United States Patent [19]

Matsuo

[11] Patent Number: 5,780,976

[45] Date of Patent: Jul. 14, 1998

[54] CONSTANT-VOLTAGE AUTOMATIC CHARGING STROBE CIRCUIT

[76] Inventor: Takumi Matsuo, 8-3, Shimo-shinshuku, Ichikawa-shi, Chiba-ken, Japan

[21] Appl. No.: 790,315

[22] Filed: Jan. 28, 1997

[30] Foreign Application Priority Data

Feb. 20, 1996 [JP] Japan .................................... 8-032398

[51] Int. Cl.$^{6}$ ........................... H05B 37/00; H02M 3/335

[52] U.S. Cl. ........................................... 315/241 P; 363/18

[58] Field of Search ............................... 321/901; 363/18, 363/19, 131; 315/242, 241 P, 241 S

[56] References Cited

U.S. PATENT DOCUMENTS

| | | | |
|---|---|---|---|
| 3,777,212 | 12/1973 | Mashimo | 315/241 P |
| 4,163,178 | 7/1979 | Hosono | 315/241 P |
| 4,305,649 | 12/1981 | Nagaoka et al. | 354/139 |
| 4,942,340 | 7/1990 | Ikawa | 315/241 P |
| 5,187,410 | 2/1993 | Shimizu et al. | 315/241 P |

FOREIGN PATENT DOCUMENTS

| | | |
|---|---|---|
| 6-16950 | 8/1992 | Japan . |
| 6-62794 | 2/1993 | Japan . |

*Primary Examiner*—Matthew V. Nguyen
*Attorney, Agent, or Firm*—Diller, Ramik & Wight, PC

[57] ABSTRACT

This invention is designed to reduce the number of parts in the circuits of a constant-voltage automatic charging strobe circuit, thus reducing the cost. In addition, it allows a user to decide when to use the strobe flash. In a oscillation charge/discharge circuit, an oscillation startup switch is installed between a battery and a transistor through the primary coil of a step-up transformer. When the switch is closed, the direct current input to the transistor is suppressed, and an abnormal input current control resister may have a low resistance value. A trigger flash circuit comprises a circuit that both controls the constant-voltage flash of a neon lamp NE and controls the oscillation stop of the transistor. A recharge circuit comprises a circuit that uses the resistor in the primary coil of the step-up transformer and a capacitor that takes out pulse fluctuations when the xenon lamp Xe is flashed. This invention also has a switch mechanism which forms a charging route in the main capacitor under normal conditions, and which acts to start the flash of the flash element and prevent recharging when the camera shutter is operated. A main capacitor can be charged when the oscillation startup switch is operated only when the user wants to use the strobe.

8 Claims, 5 Drawing Sheets

CONSTANT-VOLTAGE AUTOMATIC CHARGING STROBE CIRCUIT

BACKGROUND OF THE INVENTION

1. Field of the Invention

This invention relates to a constant-voltage automatic charging strobe circuit used in flash devices in easy-use cameras and disposable cameras.

2. Description of the Related Art

Easy-use cameras and disposable cameras have become quite popular as photographic cameras in recent years. The major advantage of these easy-use cameras and disposable cameras is that they can be obtained easily at one's destination without the trouble of carrying around a high-function camera that is bulky and difficult to operate, so they should be small and inexpensive.

FIG. 5 is a circuit diagram showing the usual structure of the flash equipment used in conventional devices of this type. This flash equipment is constructed of two major circuits: the oscillation charge/discharge circuit 1 and the trigger flash circuit 2.

The oscillation charge/discharge circuit 1 is constructed of a power circuit 10 comprising a DC/DC converter that creates high-voltage direct current; a capacitor C4 that is charged by the output of the power circuit 10; an oscillation stopping circuit comprising a Zener diode ZD1 and a transistor Q2; and a recharge circuit comprising a capacitor C2 and a resistor R5.

The trigger flash circuit 2 is constructed of a lamp display that uses a neon lamp NE to show that the capacitor C4 has reached a prescribed electric potential; and a trigger that makes the flash element flash when the charge potential of a capacitor C3 is boosted by a trigger transformer T2. The flash element may be, for example, a xenon lamp Xe.

Examination of the circuit diagram shown in FIG. 5 shows that in the oscillation charge/discharge circuit 1 of conventional devices of this type, an oscillation startup switch SW1 is directly connected to the positive electrode (+) of a battery BT. By closing the switch SW1, direct current is applied to the transistor Q1, which functions as a switching element for oscillation control. As a result, a resistor R1 has to have a high resistance value in order to control abnormal rush current, and this has the effect of reducing the switching capabilities of the transistor Q1 and limiting the ability to achieve a good rise in potential charge during startup in the capacitor C4.

In addition, in the conventional oscillation charge/discharge circuit 1 with this type of structure, the capacitor C4 is charged by the oscillatory action after the switch SW1 is pressed, thus requiring an oscillation stopping circuit to stop this oscillating action, after the trigger flash circuit 2 causes the xenon lamp Xe to flash. Formerly, this type of circuit was constructed so that the transistor Q1 was turned off by using the Zener diode ZD1 and the PNP transistor Q2.

This type of oscillation stopping circuit is expensive because it requires circuit elements (the Zener diode ZD1 and PNP transistor Q2) dedicated for the oscillation stopping circuit, and this is contrary to the requirement that easy-use cameras have the most inexpensive design possible.

Moreover, the recharge circuit of conventional devices is constructed of a series circuit comprising a resistor R4 and a capacitor C2, disposed in parallel with a coil L2 in the secondary circuit of the step-up transformer T1. The recharge circuit operates in such a way that when the xenon lamp Xe discharges (flashes), the capacitor C4 undergoes pulsed fluctuation and the fluctuating pulses are extracted through the capacitor C2; the voltage drop of the resistor R4 is utilized to apply a high pulse to the transistor Q1 (B) in order to effect reoscillation.

In addition to the capacitor C2, also requires a resistor R4 to limit the input current for the transistor Q1 as a circuit element dedicated for the recharge circuit. This unavoidably increases the number of parts in the circuit, as in the case of the oscillation stopping circuit.

As described above, the recharge circuit acts to cause reoscillating by combining the pulse fluctuations of the capacitor C4 when the xenon lamp Xe flashes, extracting these fluctuating pulses out through the capacitor C2, reducing the voltage in the resistor R4, and applying "high" pulses to the transistor Q1. After the oscillation startup switch SW1 is pressed down one time and oscillating is started in the transistor Q1, whenever the xenon lamp Xe is flashed, the transistor Q1 oscillation will be restarted and the capacitor C4 is constantly maintained in the discharge condition.

Normally, in simple cameras using this type of flash equipment, the xenon lamp Xe is discharged by operating the camera shutter and closing the trigger switch SW2. As a result, with the conventional flash equipment of this type installed with a reoscillation circuit as described above, the xenon lamp Xe always flashes when the shutter is operated whether the user wants it or not, which is inconvenient.

The installation of the conventional flash equipment inevitably raises the cost of easy-use cameras and disposable cameras because it requires many circuit parts, especially in the oscillation charge/discharge circuit, the trigger flash circuit, and the recharge circuit.

In addition, this type of conventional flash equipment does not allow the user to decide when to use the flash, because the main capacitor is recharged by the recharge circuit immediately after the flash element flashes, and the flash element always flashes whenever the camera shutter is operated thereafter.

SUMMARY OF THE INVENTION

An object of this invention is to provide a constant-voltage automatic charging strobe circuit that can reduce the costs of easy-use cameras and disposable cameras by means of a circuit structure having fewer parts in all circuit areas of the oscillation charge/discharge circuit, the trigger flash circuit, and the recharge circuit.

A further object of this invention is to provide a one-push constant-voltage automatic charging strobe circuit that lets a photographer decide when to flash the flash element.

In order to achieve these objects, the first invention provides a constant-voltage automatic discharge strobe circuit in which a switching element is activated by an oscillation startup switch, a voltage of a battery is boosted in a step-up transformer, a main capacitor and a trigger capacitor are charged, the trigger capacitor is caused to discharge by operating a trigger switch, and a discharge current is boosted by a trigger transformer and applied to a flash element so as to cause a discharge from the main capacitor and cause the flash element to flash, which comprises oscillation startup means in which the oscillation startup switch is connected through a primary coil of the step-up transformer between one terminal of the battery and a startup terminal of the switching element.

In the first invention, the constant-voltage automatic strobe circuit further comprises oscillation stopping means which includes the trigger capacitor and a display element connected in parallel to the trigger capacitor and which, by repeatedly charging from the step-up transformer to the trigger capacitor and discharging from the trigger capacitor to the display element, acts at a constant voltage to control the display of the display element and separates by the constant voltage action a charging current toward a direction of the switching element to turn off the switching element.

In the first invention, the constant-voltage automatic strobe circuit further comprises recharging means in which a capacitor is disposed in a feedback route from an output side of the step-up transformer to a resistor element that forms the oscillation startup means, for restarting the switching element in response to fluctuating pulse components of the discharge current from the main capacitor when the flash element is flashed.

In the first invention, the trigger switch comprises switchover switch means having switchover contact points that connect the step-up transformer with the main capacitor in a normal state and that are connected to the trigger transformer side when operated to thereby start the flash action of the flash element, and in which the trigger switch causes the main capacitor to be charged and enables the flash element to flash only when the trigger switch is in the normal state and the oscillation startup switch is operated.

The second invention provides a constant-voltage automatic charging strobe circuit which comprises: a power boosting circuit that boosts a voltage of a battery by starting a switching element provided in a primary circuit of a step-up transformer to generate an induced electromotive force in a secondary coil from a primary coil of the step-up transformer; a main capacitor that is charged by an output of the power boosting circuit; a trigger flash circuit including a trigger capacitor that is charged by the output of the power boosting circuit and that starts a flash action of a flash element which is connected in parallel to the main capacitor; oscillation startup means in which an oscillation startup switch is connected through the primary coil of the step-up transformer between one terminal of the battery and a startup terminal of the switching element; oscillation stopping means which, by repeatedly charging to the trigger capacitor and discharging to a display element connected in parallel to the trigger capacitor, acts at a constant voltage to control a display of the display element and separates by the constant-voltage action a charging current toward a direction of the switching element to turn off the switching element; and recharging means including a capacitor disposed in a feedback route from an output side of the step-up transformer to a resistor element that forms the oscillation startup means, for recharging the switching element in response to fluctuating pulse components of a discharge current from the main capacitor when the flash element is flashed.

The third invention provides a constant-voltage automatic charging strobe circuit in which a switching element is started with an oscillation startup switch, a voltage of a battery is boosted in a step-up transformer, a main capacitor and a trigger capacitor are charged, the trigger capacitor is caused to discharge by operating a trigger switch, and a discharge current is boosted by a trigger transformer and applied to a flash element so as to cause a discharge in the main capacitor and cause the flash element to flash, in which the trigger switch is configured of a witching mechanism which forms a charging path for the main capacitor in a normal state and which acts to flash the flash element and prohibit the restart of the switching element when operated, and in which the oscillation startup switch is operated to enable the charging of the main capacitor only when the flash of the flash element is required.

In the third invention, the switching mechanism comprises three-contact switchover switch means having switchover contact points that connect the step-up transformer with the main capacitor in a normal state and that are connected to the trigger transformer when operated to thereby start the flash operation of the flash element.

In the third invention, the switching mechanism comprises two-circuit, three-contact, parallel make contact-point switch means which is connected to the switching element and the trigger transformer when operated and which acts to start the flash operation of the flash element and stop the activation of the switching element.

In the first and second inventions, the oscillation charge/discharge circuit comprises an oscillation startup switch disposed between the battery and the switching element through the primary coil of the step-up transformer, and the input of direct current to the switching element is suppressed when the oscillation startup switch is closed. As a result, a low resistance value is sufficient in the abnormal rush current limiting resistor, and the cost of the equipment can be reduced. In addition, according to this structure, the activation characteristic of the switching element can be improved as a current is applied to the switching element along with the induced electromotive force generated in the secondary coil by the current flowing in the primary coil of the step-up transformer when the oscillation startup switch is closed.

In the first and second inventions, constant-voltage flash control of the display element and oscillation stop control that turns off the switching element and stops the oscillating are both performed by the circuit structure in the trigger flash circuit. This requires much fewer parts and is much less expensive than circuit structures that turn off the switching element using Zener diodes and PNP transistors.

Moreover, in the first and second inventions, the recharge circuit for capturing pulse fluctuations caused by the flashing action of the flash element and for applying a voltage required for reoscillation of the switching element is realized by a circuit structure that uses an existing resistor element in the primary circuit of the step-up transformer. As a result, the number of circuit parts is reduced relative to circuits in which the resistor element is provided independently, and this also can reduce the costs.

In addition, according to the third invention, since a switching mechanism is added as a trigger switch which forms in a normal state the charging route for the main capacitor and which, along with the operation of the camera shutter, activates flash by the flash element and prevents recharging, it is possible to provide a one-push constant-voltage strobe circuit in which the main capacitor is charged and the flash goes off when the shutter is operated, by operating the oscillation startup switch only when a user wants to use the strobe.

DESCRIPTION OF THE PREFERRED EMBODIMENTS

Figure 1:
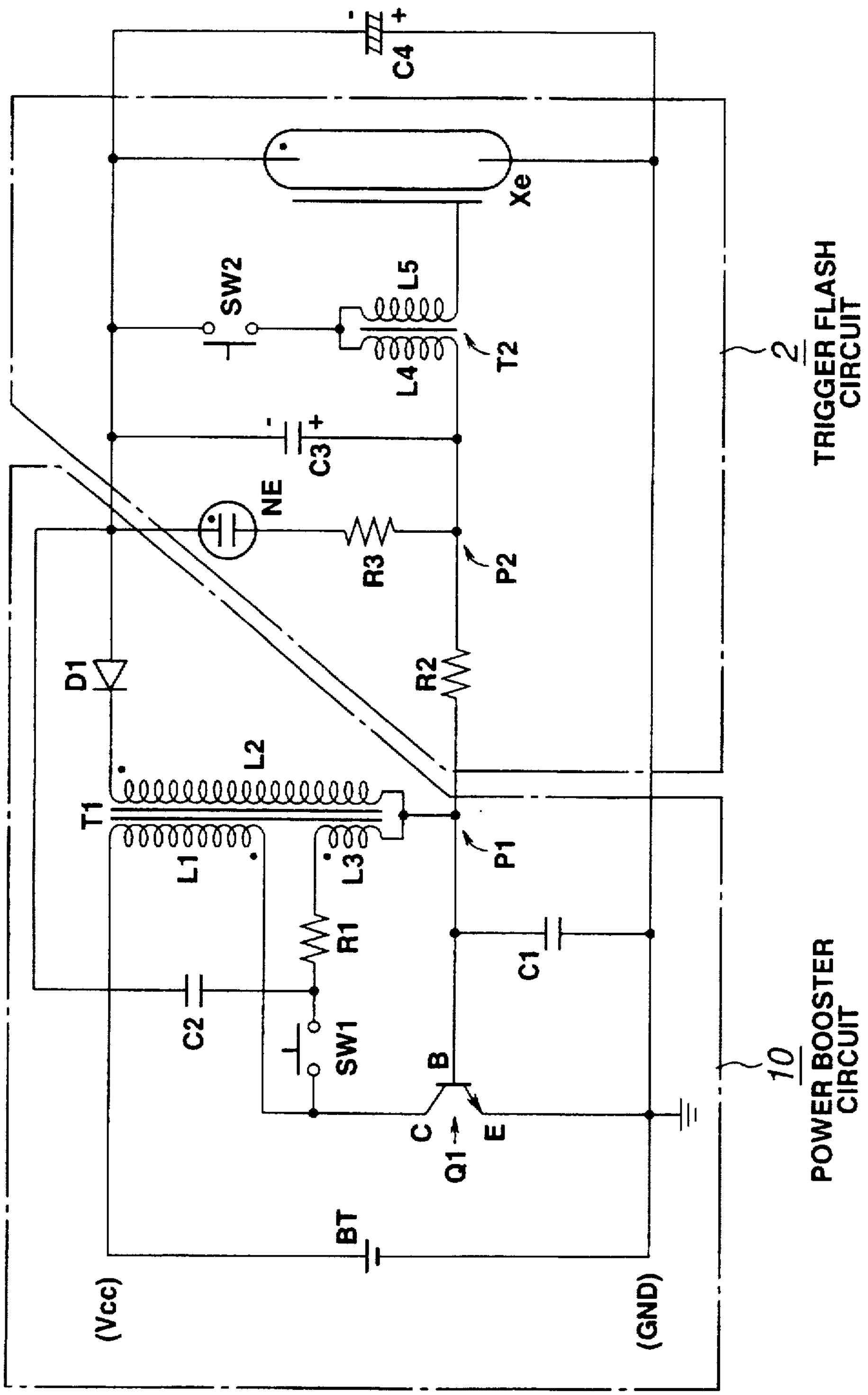
FIG. 1 is a circuit diagram of the first embodiment of the constant-voltage automatic charging strobe circuit of this invention.

Following is a detailed explanation of the embodiments of this invention, with references to the attached diagrams. FIG. 1 is a circuit diagram showing the structure of the first embodiment of the constant-voltage automatic charging strobe circuit of this invention. This circuit is used as flash equipment for easy-use cameras and disposable cameras. As shown in the diagram, it is constructed of a power booster circuit 10 that has a DC/DC converter that boosts a voltage of a battery BT to high voltage direct-current; a main capacitor C4 that is charged by an output of the power booster circuit 10; and a trigger flash circuit 2 which is connected between the main capacitor C4 and the power booster circuit 10 and which controls the timing of the discharge from the main capacitor C4 to start the flash action of a flash element.

The power booster circuit 10 comprises a battery BT, a step-up transformer T1, a rectifying diode D1, an oscillation startup switch SW1, a resistor R1, a transistor Q1, and a capacitor C1. The step-up transformer T1 has three coils per core: a primary coil L1, a secondary coil L2, and a negative feedback coil L3. The positive terminal of the primary coil L1, which is marked with a dot, is connected to the collector C of the transistor Q1 and also connected to the positive terminal of the negative feedback coil L3 through the switch SW1 and the resistor R1. The negative terminal of the primary coil L1 (without a dot mark) is connected to the positive electrode of the battery BT. The negative electrode of the battery BT and the emitter E of the transistor Q1 are connected to each other. However, the negative terminal of the diode D1 is connected to the positive terminal of the secondary coil L2. The negative terminal of the secondary coil L2 is connected to the base B of the transistor Q1 and one end of the capacitor C1.

The positive terminal of the diode D1 and the other end of the capacitor C1 are connected to each end of the main capacitor C4, respectively. The power booster circuit 10 and the capacitor C4 form the oscillation charge/discharge circuit described in the section of the description of the related art. The oscillation charge/discharge circuit of this invention is equipped with a recharge circuit in which a capacitor C2 is connected between the positive terminal of the diode D1 and the resistor R1 of the primary circuit of the transformer T1.

The trigger flash circuit 2 is configured by a series circuit of a resistor R2 connected to the negative terminal of the negative feedback coil L3 of the step-up transformer T1, a resistor R3 connected in parallel to the step-up transformer T1 between one end of the resistor R2 and the positive terminal of the diode D1 and a neon lamp NE; a series circuit of a trigger capacitor C3 similarly connected in parallel to the step-up transformer T1, a trigger transformer T2 similarly connected in parallel to the step-up transformer T1 and a trigger switch SW2; and a flash element (a xenon lamp Xe is used in this example) connected in parallel to the capacitor 4 and connected to the transformer T2 at its trigger electrode. The trigger transformer T2 has a primary coil L4 and a secondary coil L5. The trigger switch SW2, like the oscillation startup switch SW1, is a non-locking type that stays in position only when it is pressed and automatically returning to its original position if this force is removed. Devices other than the xenon lamp Xe described above can be used as the flash element.

The circuit operates in the following manner: The oscillatory charging action is started by pressing the oscillation startup switch SW1. That is, when the switch SW1 is pressed, the startup current flows from the battery BT (+) to the coil L1 to the switch SW1 to the resistor R1 to the coil L3 to the transistor Q1 (B) to the battery BT (−), and the transistor Q1 is turned on. At this time, slight induced electromotive force is produced in coil L2 from coil L1, and the current generated from this induced electromotive force is superimposed to the input current from the coil L2 to the transistor Q1 (B), that acts to improve the activation characteristic of the transistor Q1.

As described above, in the present invention, since the switch SW1 is disposed between the battery BT and the transistor Q1 through the primary coil L1 of the step-up transformer T1, the direct current flowing when the switch SW1 is closed into to the transistor Q1 can be reduced. As a result, the abnormal rush current control resistor R1 can have a low resistance value, helping to stabilize the switching action during the startup of the transistor Q1.

Furthermore, the capacitor C1 connected between the emitter E and the base B of the transistor Q1 in the power booster circuit 10 is provided for controlling the operation timing of the transistor Q1. If the capacitance of this capacitor C1 is increased, the switching action of the transistor Q1 will deteriorate and oscillation will stop at an early stage, and the oscillation will not stop if the capacitor C1 is removed.

When the transistor Q1 is turned on, the current flows from the battery BT (+) to the coil L1 to the transistor Q1 (C) to the transistor Q1 (E) to the battery BT (−). A high voltage is induced in the coil L2 by the magnetic flux linkage created at this time between coil L1 and coil L2.

Due to the high voltage induced in coil L2, the current flows from coil L2 to transistor Q1 (B) to transistor Q1 (E) to capacitor C4 (+) to capacitor C4 (−) to diode D1 (anode) to diode D1 (cathode) to coil L2. At this time, a half-wave rectification current converted to a direct current by the diode D1 is charged as a charge current in the capacitor C4.

As the charging to the capacitor C4 advances and the voltage across its terminals gradually increases, the voltage of the transistor Q1 (B) seen from the capacitor C4 (−) (the potential at point P1 in FIG. 1) also increases along with the increase in the voltage across the both ends of the capacitor C4. This is accompanied by an increase in the impedance of the capacitor C4 and a decrease in the charge current flowing from the coil L2 to the point P1 to the transistor Q1 (B) to the transistor Q1 (E) to the capacitor C4 (+) to the capacitor C4 (−) to the diode D1 (anode) to the diode D1 (cathode) to the coil L2.

At the same time the capacitor C4 is charged as described above, the trigger capacitor C3 is charged by the current flowing from the coil L2 to the point P1 to the resistor R2 to the point P2 to the capacitor C3 (+) to capacitor C3 (−) to diode D1 (anode) to diode D1 (cathode) to coil L2. When the potential at the point P2 reaches a breakdown voltage of the neon lamp NE due to the charge of the trigger capacitor C3, part of the charges of the trigger capacitor C3 will flow as a leak current from the capacitor C3 (+) to the point P3 to the resistor R3 to the neon lamp NE (+) to the neon lamp NE (−) to the capacitor C3 (−), causing the neon lamp NE to light.

When it is lit, the neon lamp NE is conductive, and the discharge current from the capacitor C3 will be reduced. With the lighting of the neon lamp NE, the potential at the point P2 in FIG. 1 falls to a voltage at which the neon lamp NE distinguishes, whereupon the neon lamp NE goes off, causing the trigger capacitor C3 to recharge. If the charge and discharge actions in the parts of the circuit described above are repeated, the neon lamp NE will appear to blink.

The breakdown voltage of the neon lamp NE is set to a charge potential of the capacitor C4 at which the xenon lamp Xe is dully lit. Consequently, when the neon lamp NE blinks, this lets the user know that the charge potential in the capacitor C4 has reached a level at which the flash can be used and that the flash can be operated at any time.

As noted from the charge/discharge repetition action of the trigger capacitor C3, the circuit component consisting of the trigger capacitor C3, the resistor R3, and the neon lamp NE forms a constant-current circuit for blinking the neon lamp NE. Because of this constant-current circuit, at the point P1 in the capacitor C4 charge circuit described above (L2 to Q1 (B) to Q1 (E) to C4 (+) to C4 (−) to D1 (anode) to D1 (cathode) to L2), a certain mount of current is branched from the point P1 to the resistor R2 to the point P2 with respect to the current from the coil L2 to the point P1 to the transistor Q1 (B).

In other words, in the circuit of the first embodiment of this invention, the action described above in which the charge current for capacitor C4 decreases with an increase in voltage at the both ends of capacitor C4, combined with the action in which constant current is branched in the direction of coil L2 to resistor R2 to point P2, with point P1 as the boundary, has the effect of accelerating the reduction in the current flowing from coil L2 to point P1 to transistor Q1 (B). As a result, while the charge voltage of the capacitor C4 increases further and the current flowing from the coil L2 to point P1 to the transistor Q1 (B) to the transistor Q1 (E) is reduced, if the value of this current is reduced to below the value of the current flowing from point P1 to resistor R2 to point P2, transistor Q1 (B) will be at a "low" level, the transistor Q1 will be turned off, and the flash will be stopped.

To understand this circuit action, note that the trigger flash circuit 2 in the first embodiment of this invention is implemented by a structure that uses the constant-voltage flash control of the neon lamp NE, previously used only for the lamp display, in the oscillation stop control as well, which turns the transistor Q1 on and off and stops the oscillation.

This circuit structure does not require a conventional oscillation stop circuit that employs a Zener diode and a PNP transistor to turn off the switching element Q1, and it is simpler than the conventional circuit structure.

After the oscillation is stopped by turning off the transistor Q1, if the trigger switch SW2 is pressed, the current flows from the capacitor C3 (+) to the transformer T2 (L4) to the switch SW2 to the capacitor C3 (−) because of the discharge from the trigger capacitor C3. As a result, a high voltage is induced in the secondary coil L5 from the primary coil L4 of the transformer T2, and this high voltage is applied to the trigger electrode of the xenon lamp Xe. When this applied voltage is raised to the breakdown voltage of the xenon lamp Xe, the xenon lamp Xe will flash.

Accompanying this xenon lamp Xe breakdown, the discharge pulse current from the capacitor C4 suddenly flows into the xenon lamp Xe. At this time, the capacitor C2 in the primary circuit of the step-up transformer T1, responding to this discharge pulse, inputs a "high" pulse to the transistor Q1 (B) through the resistor R1 and the coil L3. Because of this "high" pulse, the transistor Q1 is turned on again, oscillating starts, and the capacitor C4 is recharged.

To further understand this circuit action, note that because the recharge circuit in the first embodiment uses the existing resistor R1 in the primary circuit of the transformer T1, it is possible to reduce circuit parts in the recharge circuit dedicated for recharging the transistor Q1 (B), such as the current control resister R5 in conventional circuit, and this can reduce costs.

The second embodiment of this invention differs from the first embodiment in some respects. In the circuit of the first embodiment (see FIG. 1), after the oscillation charge action is started by pressing the oscillation startup switch SW1, the xenon lamp Xe is caused to flash by operating the shutter and short-circuiting the trigger switch SW2. The pulse fluctuation component of the discharge current from the capacitor C4 at this time is delivered to the capacitor C2, a "high" pulse is transmitted to the transistor Q1 (B) through the resistor R1 and the coil L3, and the transistor Q1 is restarted. In other words, in the circuit of the first embodiment, the flash strobe normally will flash at any time and any place if the camera shutter is operated.

However, considering the various uses of the camera, letting the strobe flash whenever the camera shutter is operated does not necessarily make it easy to use. For example, in many cases, the photographer wants to decide when and where to use the strobe.

Figure 2:
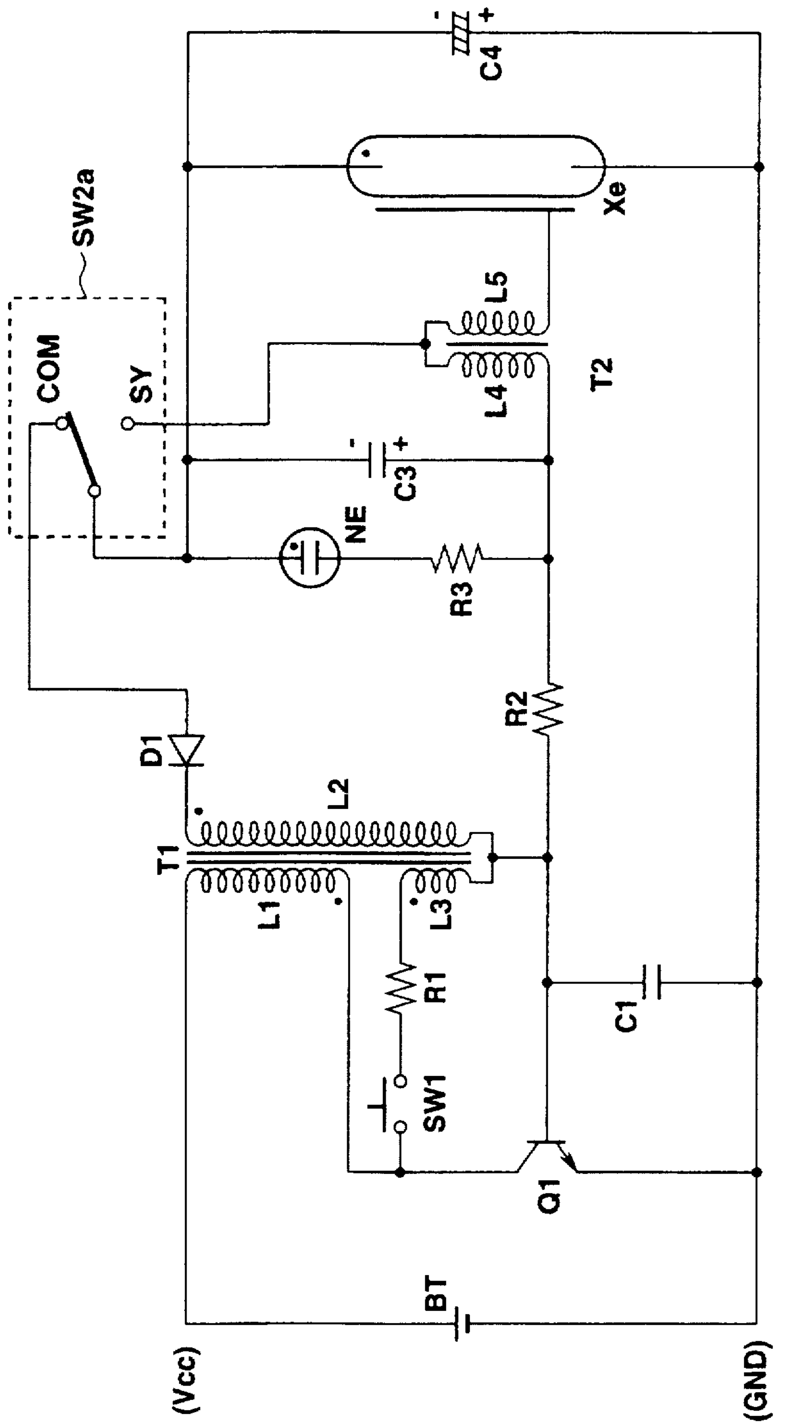
FIG. 2 is a circuit diagram of the second embodiment of the one-push constant-voltage automatic charging strobe circuit of this invention.

Accordingly, the second embodiment of this invention provides a constant-voltage strobe circuit in which the user can use a one-push operation to select whether the strobe will flash or not. FIG. 2 is a circuit diagram that shows the structure of the one-push constant-voltage strobe circuit of the second embodiment of this invention. In this circuit, a switchover switch SW2 is connected between the positive terminal of the diode D1 and both the neon lamp NE and the trigger transformer T2. In this circuit, there is no recharge circuit as in the circuit shown in FIG. 1, in which the capacitor C2 is connected between the positive terminal of the diode D1 and the resistor R1 of the primary circuit of the transformer T1.

In other words, the second embodiment has the same circuit structure as the first embodiment (see FIG. 1), except for the following points:

It does not require a capacitor for restarting (capacitor C2 in the circuit shown in FIG. 1.)

As the trigger switch SW2, which was a mechanical two-contact-point switch, it uses a switchover switch SW2*a* that acts to stop the reoscillation of the power booster circuit when the camera shutter is operated.

In the second embodiment, the armature of the switchover switch SW2*a* is normally connected to the COM side. If the camera shutter is operated in this state, the armature moves to the SY side, causing the xenon lamp Xe to flash. At this time, the COM side of the switchover switch SW2 is opened. In the power booster circuit, the oscillation startup switch SW1, which has already completed the oscillation startup operation, is also open at this time. Consequently, after the camera shutter is operated and the xenon lamp Xe has flashed, the transistor Q1 cannot reoscillate. In other words, reoscillation is possible in this circuit only if the armature of the selector switch SW2*a* is on the COM side, and the oscillation startup switch SW1 is pressed. In the second embodiment, it is possible that the oscillation startup switch SW1 is pressed and the main capacitor C4 is charged only when strobe photography is necessary.

For example, if a strobe flash is not considered necessary, the user can operate the shutter without pressing the oscillation startup switch SW1. In this case, the trigger voltage is not charged in the main capacitor C4 and the trigger capacitor C3, so even if the camera shutter is operated and the armature of the selector switch SW2*a* is switched from the COM side to the SY side, the trigger transformer T2 is not energized and the xenon lamp Xe does not flash.

However, if a strobe flash is required, the user first presses the oscillation startup switch SW1. As a result, the main capacitor C4 and the trigger capacitor C3 are charged with the direct current, and when this charge voltage reaches the trigger voltage, the neon lamp Ne blinks. Then, when the user operates the camera shutter, the armature of the selector switch SW2*a* switches from the COM side to the SY side, and the trigger transformer T2 is energized by the discharge current from the trigger capacitor C3, causing the xenon lamp Xe to flash. At the same time as the flash, the COM side of the selector switch SW2*a* used as the trigger switch is opened. Also at this time, the oscillation startup switch SW1 is opened. Consequently, the transistor Q1 cannot reoscillate. In other words, this circuit allows the user to flash the strobe for one time as necessary.

Figure 3:
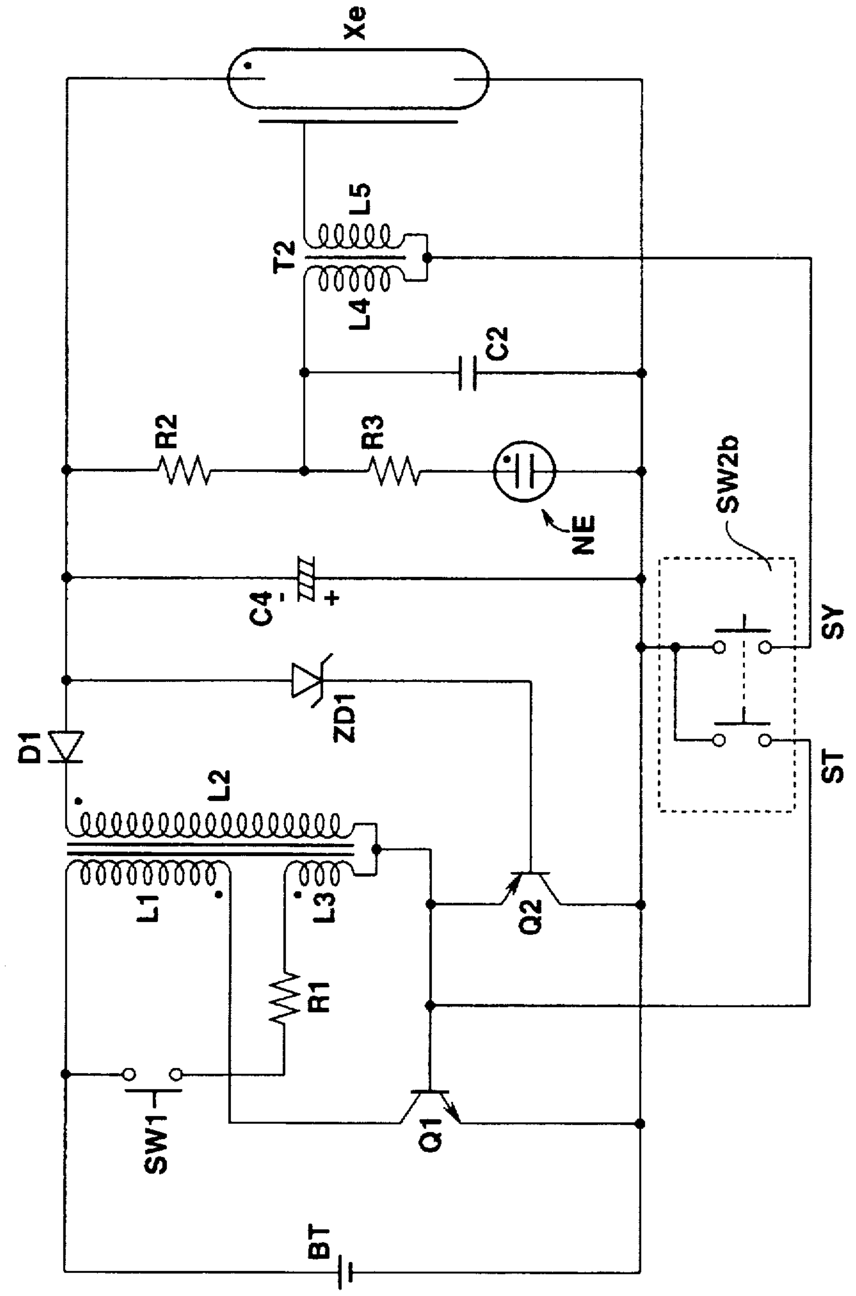
FIG. 3 is a circuit diagram of the third embodiment of the one-push constant-voltage automatic charging strobe circuit of this invention.
Figure 5:
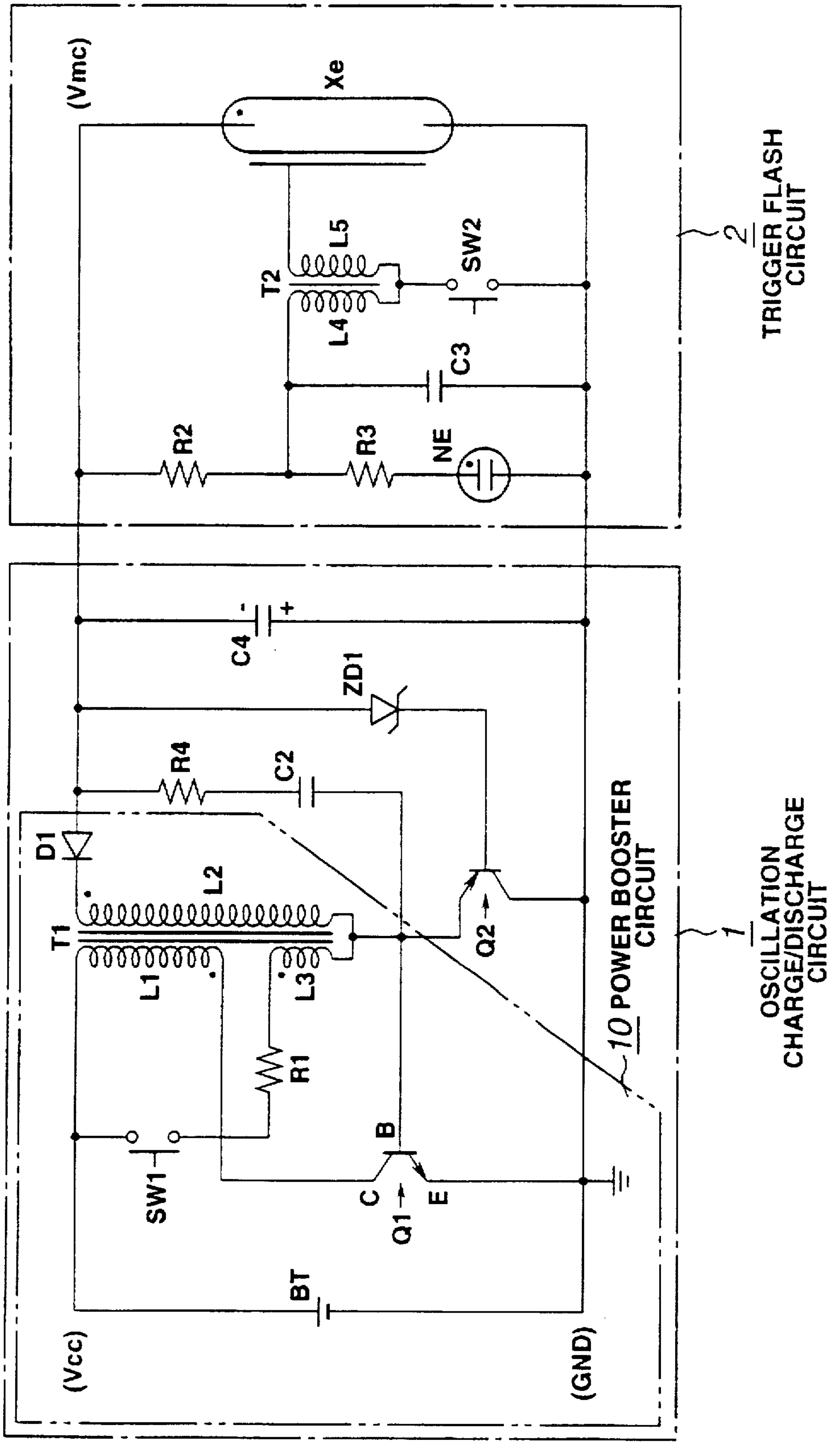
FIG.5 (PRIOR ART)
FIG. 5 is a circuit diagram showing the structure of the conventional flash equipment.

FIG. 3 is a circuit diagram showing the structure of the one-push constant voltage strobe circuit of the third embodiment of this invention. This circuit has the same technical concepts as the circuit shown in FIG. 2; that is, the concept of a trigger switch mechanism that allows the user to decide when a strobe flash is necessary or not. This circuit is an example of a case in which this technical concept is used in a conventional circuit like that shown in FIG. 5. It does not have the switchover switch of the circuit shown in FIG. 2 as the switch mechanism, but it uses a parallel make contact point switch SW2*b* having a two-circuit, three-contact structure.

In this circuit, under normal conditions, the parallel make contacts of the switch SW2*b* are open, as shown in the diagram. By pressing the oscillation startup switch SW1 in this condition, the capacitor C4 and the trigger capacitor C2 are charged. After this, if the camera shutter is operated, the parallel make contact points of the switch SW2*b* close at the same time. At this time, the discharge current from the trigger capacitor C2 flows to the trigger transformer T2 and between the transistors Q1 and Q2 through, respectively, the SY side and the ST side of the parallel make contact points. The trigger transformer current energizes the trigger transformer T2, causing the xenon lamp Xe to flash; and the reoscillating effect of the transistor Q1 is regulated by the transistor current. After this, as long as the oscillation startup switch SW1 is not pressed and the capacitor C4 is not charged, the xenon lamp Xe cannot flash even if the camera shutter is operated. In this way, the strobe can be flashed whenever necessary by pressing the oscillation startup switch SW1 and initiating charging conditions.

Figure 4:
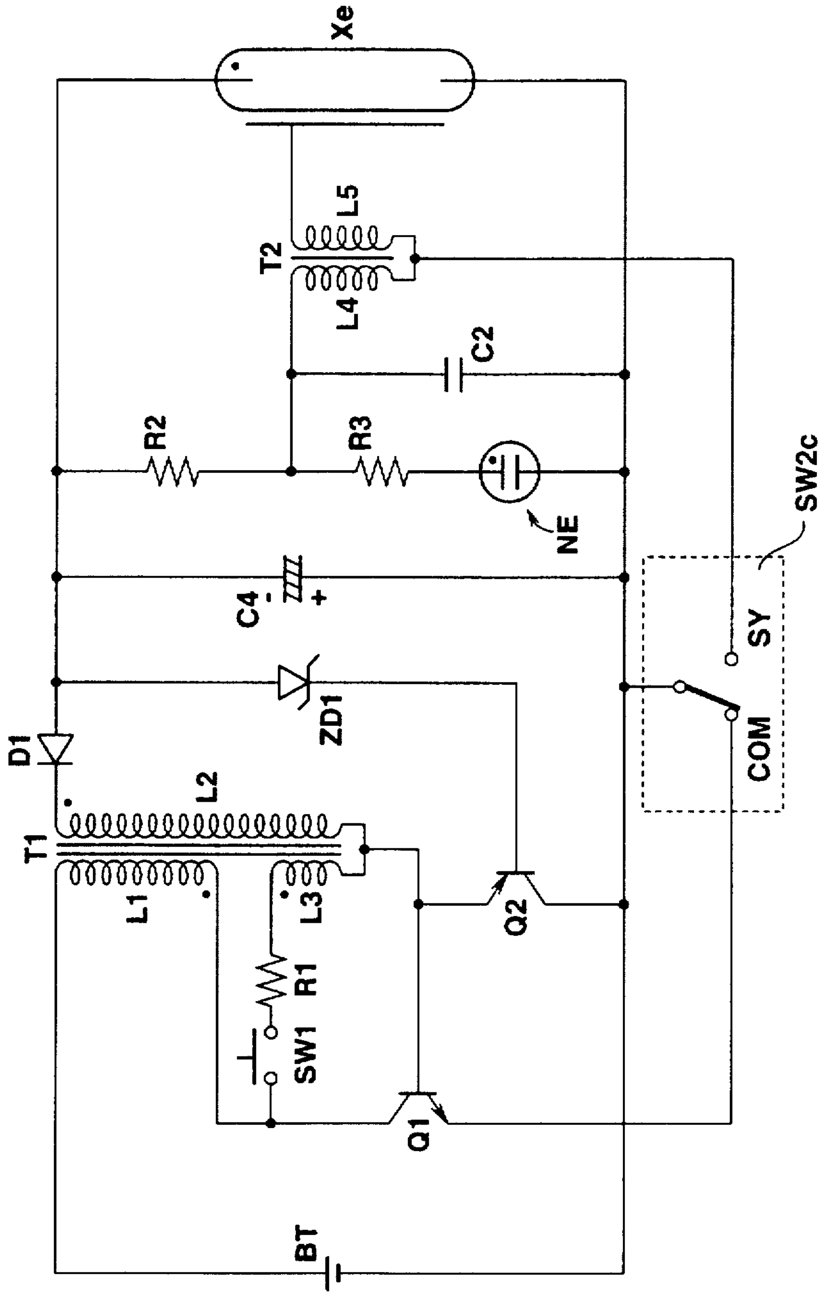
FIG. 4 is a circuit diagram of the fourth embodiment of the one-push constant-voltage automatic charging strobe circuit of this invention.

FIG. 4 is a circuit diagram that shows the structure of the one-push constant-voltage strobe circuit of the fourth embodiment of this invention. Like the circuits shown in FIGS. 2 and 3, this circuit exemplifies the technical concept of a trigger switch mechanism that allows the user to decide when a strobe flash is necessary or not. The basic structure of this circuit uses the oscillation startup switch circuit shown in FIG. 1 and conventional circuitry for the secondary coil L2 of the step-up transformer T1 (see FIG. 5). Instead of a trigger switch, it uses a switchover switch SW2*c* like the circuit shown in FIG. 2 as the switching mechanism.

In this circuit, when the armature of the switchover switch SW2*c* is on the COM side, and the oscillation startup switch SW1 is pressed, the capacitor C4 and the trigger capacitor C2 are charged. If the camera shutter is operated under these conditions, the armature of the selector switch SW2*c* is switched to the SY side, causing the xenon lamp Xe to flash. At this time, because the armature of the selector switch SW2*c* is open on the COM side and the oscillation startup switch SW1 is open, the transistor Q1 cannot oscillate. As a result, this circuit makes it possible to control the xenon lamp Xe so it will not flash as long as the oscillation startup switch SW1 is not pressed and the capacitor C4 is not charged, even if the camera shutter is operated.

A one-push constant-voltage strobe circuit can be manufactured simply without complicated and expensive circuit elements, as mentioned above in the embodiments 2–4 of this invention, by using a three-contact-point switch mechanism instead of a trigger switch.

What is claimed is:

1. A constant-voltage automatic charging strobe circuit in which a switching element is started with an oscillation startup switch, voltage of a battery is boosted in a step-up transformer, a main capacitor and a trigger capacitor are charged, the trigger capacitor is discharged by operating a trigger transformer and applied to a flash element to cause a discharge in the main capacitor and cause the flash element to flash, wherein the constant-voltage automatic charging strobe circuit further comprises:

oscillation startup means in which one end of the oscillation startup switch is connected through a primary coil of the step-up transformer with one terminal of the battery and the other end of the oscillation startup switch is connected through a resistor element with a startup terminal of the switching element.

2. The constant-voltage automatic charging strobe circuit as claimed in claim 1 further comprising oscillation stopping means which includes the trigger capacitor and a display element connected in parallel by a parallel circuit to the trigger capacitor, one end of the parallel circuit being connected with the start terminal of the switching element, and which, by repeatedly charging from the step-up transformer to the trigger capacitor and discharging from the trigger capacitor to the display element, acts as a constant current to control the display element and separates by the constant current action a charging current flowing through a charging path between the step-up transformer and the main capacitor to turn off the switching element.

3. The constant-voltage automatic charging strobe circuit as claimed in claim 1 or claim 2 further comprising recharging means in which a capacitor is disposed in a feedback route from an output side of the step-up transformer to the resistor element of the oscillation startup means, for restarting the switching element by inputting fluctuating pulse components of the discharge current from the main capacitor when the flash element is flashed to the start terminal of the switching element thorough the capacitor and the resistor element.

4. The constant-voltage automatic charging strobe circuit as claimed in claim 1 or claim 2, wherein the trigger switch includes a switch mechanism which acts to prohibit the restart of the switching element along with the flash of the flash element when the switch is operated and, after the trigger switch is operated and the flash element is flashed once, acts to prohibit the flash of the flash element by the operation of the trigger switch until the oscillation startup switch is operated again.

5. A constant-voltage automatic charging strobe circuit, comprising:

a power boosting circuit that boosts a voltage of a battery by starting a switching element provided in a primary circuit of a step-up transformer to generate an induced electromotive force in a secondary coil from a primary coil of the step-up transformer;

a main capacitor that is charged by an output of the power boosting circuit;

a trigger flash circuit including a trigger capacitor that is charged by the output of the power boosting circuit and that starts a flash action of a flash element which is connected in parallel to the main capacitor;

oscillation startup means including an oscillation startup switch which is connected at one end thereof with one terminal of the battery through the primary coil of the step-up transformer and at the other end thereof with a startup terminal of the switching element through a resistor element;

oscillation stopping means which includes the trigger capacitor and a display element connected in parallel to the trigger capacitor, one end of the parallel circuit being connected with the start terminal of the switching element, and which, by repeatedly charging from the step-up transformer to the trigger capacitor and discharging from the trigger capacitor to the display element, acts at a constant current to control the display of the display element and separates by the constant-current action a charging current flowing through a charging path between the step-up transformer and the main capacitor to turn off the switching element; and recharging means including a capacitor disposed in a feedback route from an output side of the step-up transformer to the resistor element that forms the oscillation startup means, for recharging the switching element by inputting fluctuating pulse components of a discharge current from the main capacitor when the flash element is flashed to the start terminal of the switching element through the main capacitor and the resistor element.

6. A constant-voltage automatic charging strobe circuit in which a switching element is started with an oscillation startup switch, a voltage of a battery is boosted in a step-up transformer, a main capacitor and a trigger capacitor are charged, the trigger capacitor is caused to discharge by operating a trigger switch, and a discharge current is boosted by a trigger transformer and applied to a flash element so as to cause a discharge in the main capacitor and cause the flash element to flash, wherein the trigger switch is composed of a switch mechanism which acts to prohibit the restart of the switching element along with a flash of the flash element when the switch is operated and, after the trigger switch was operated and the flash element flashed once, acts to prohibit the flash of the flash element by the operation of the trigger switch until the oscillation startup switch is operated again.

7. The constant-voltage automatic charging strobe circuit as claimed in claim 6, wherein the switching mechanism comprises three-contact-point switchover switch means disposed on a charging path between the step-up transformer and the main capacitor, which establishes the charging path when not operated and which is connected to the trigger transformer side when operated to thereby start the flash operation of the flash element and open the charging path.

8. The constant-voltage automatic charging strobe circuit as claimed in claim 6, wherein the switching mechanism comprises two-circuit, three-contact-point, parallel make contact-point switch means which is provided between a charging path formed between the step-up transformer and the main capacitor and the step-up transformer or the start terminal of the switching element, which opens the connection between the charging path and the step-up transformer or the start terminal of the switching element when not operated, which connects the charging path with the step-up transformer or the start terminal of the switching element when operated and which acts to start the flash operation of the flash element and stop the activation of the switching element.

* * * * *